Figure 1:
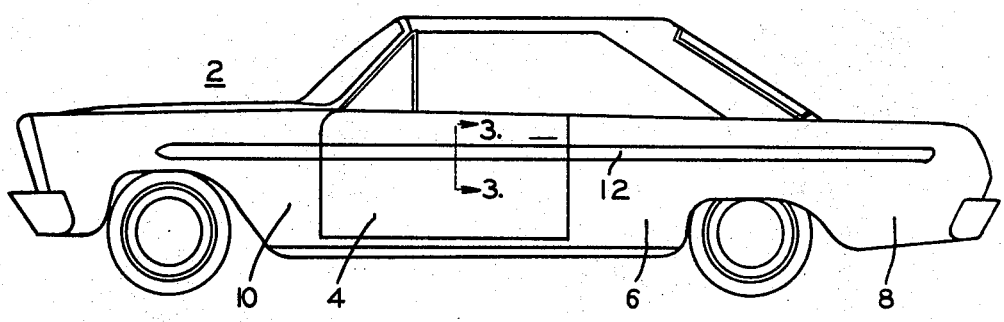

United States Patent

Loew

[15] 3,687,502

[45] Aug. 29, 1972

[54] BUMP-PROTECTION MOLDING

[72] Inventor: Theodore Loew, Schenectady, N.Y.

[73] Assignee: The Standard Products Co., Cleveland, Ohio

[22] Filed: June 8, 1970

[21] Appl. No.: 44,212

[52] U.S. Cl. ..........................293/1, 293/62, 52/716
[51] Int. Cl. ................................................B60r 13/04
[58] Field of Search.......293/1, 54 D, 71 R, 71 P, 62; 267/139, 140, 141; 52/716, 717, 718

[56] References Cited

UNITED STATES PATENTS

| | | | |
|---|---|---|---|
| 3,290,082 | 12/1966 | Fritsch | 293/1 |
| 3,572,798 | 3/1917 | Kunevicius | 293/1 |
| 3,441,305 | 4/1969 | Trammell, Jr. | 293/1 |
| 3,471,979 | 10/1969 | Herr | 52/100 |
| 2,873,993 | 2/1959 | Savke | 293/62 |
| 2,958,555 | 11/1960 | Johnson et al. | 293/62 |
| 3,543,465 | 12/1970 | Jackson | 52/716 |
| 3,201,212 | 8/1965 | Zaremski | 29/183.5 |

*Primary Examiner*—Arthur L. La Point
*Assistant Examiner*—Robert Saifer
*Attorney*—Meyer, Tilberry and Body

[57] ABSTRACT

The disclosure is of a molding in the form of a V, wherein the vertex of the V extends outward from the panel which the molding protects. The legs or free ends of the V are secured to the panel which is to be protected, and toward that end, opposed flanges extending outward are secured to the free ends of the V and are provided with a pressure sensitive adhesive to cause the molding to adhere to the panel. The body of the molding is formed with a cavity between the legs of the V in order that the molding may be flexible about an axis of symmetry passing through the vertex of the V. Either or both flanges on the vertex side of the V can be and preferably are provided with a decorative strip. The axial thickness of the body at the vertex is roughly one-third of the total thickness of the molding from the outer extremity of the vertex to the surface of the panel to which it is secured.

3 Claims, 3 Drawing Figures

PATENTED AUG 29 1972 3,687,502

INVENTOR.
THEODORE LOEW
BY
Meyer, Tilberry & Body
ATTORNEYS.

BUMP-PROTECTION MOLDING

BACKGROUND OF THE INVENTION

The field of the invention is protective moldings for finished panels which are subject to damage by contact with sharp objects. More specifically, a principal field of the invention is the side panels and doors of automobile bodies, and especially the "high spots" of such side panels and doors. As will be recalled by those skilled in the art, it is currently fashionable to make such side panels and doors in a curved form so that a portion of the side of the automobile sticks out farther than the rest of the car body. Moreover, it has been the fashion of late to provide some automobile bodies with a sharp line or ridge in order to simulate sculptured steel. The crease or ridge which forms the angle of the sculpture is highly exposed and is extremely vulnerable to damage especially when the automobile is parked alongside another car and the door of the other car is carelessly opened and banged into the panel of the adjacent automobile. The critical aspect of the problem in making a molding to protect such a bulge or ridge is the variety thereof. Bulges (or ridges) on automobiles vary from manufacturer to manufacturer, from model to model, and from year to year, and there is no commercially available molding that is universally applicable. There is a need for a molding with a high degree of transverse flexibility to make it adaptable to many different shapes.

In the prior art, it has often been customary to place moldings and other trim items on the side panels solely with a view to obtaining a desired artistic effect, rather than with a view to protecting the high spot of the car panel. Such trim strips and moldings are usually not placed in a location which will offer much if any protection to the car from the doors of other automobiles opened forcibly into the side of the protected car. Where such protective strips have been applied, these have often been simple chrome-plated steel strips which present excellent collecting places between the strip and the car body for corrosive salts such as those that are used to maintain roads free from ice and which destroy automobile bodies.

SUMMARY OF THE INVENTION

It is an object of this invention to provide a tough, yet flexible, protective molding for finished panels which are exposed and thus are vulnerable to damage by contact with sharp or heavy objects which may be forcibly driven against such panels.

It is a further object to provide a molding which serves to protect an exposed panel while at the same time adding to the esthetic appeal of the panel.

It is a still further object of the invention to provide a protective molding which can be applied by the ultimate customer-user of the property which is made with exposed panels subject to damage.

It is another object of the invention to provide a protective molding which is applicable to a wide variety of sizes and shapes of panels having protruding shapes, edges, or ridges.

The invention relates to a molding to protect a finished, the molding being of a tough resilient substance such as a vinyl resin and formed to have a high degree of transverse flexibility. To achieve that flexibility, the body of the molding is formed to resemble a V in cross-section, with the vertex of the V being quite thin so as to be flexible, and the free ends of the V carrying opposed and outward-extending flanges which are adapted to be secured by a pressure sensitive adhesive to the panel which is to be protected. A molding made according to this invention can serve the purpose of protecting the panel to which it is secured even though it may not perform any decorative function, but of course in many cases it will be desirable to provide a protective molding which is also pleasing in appearance and toward that end, the outer surface of the two flanges can be provided with a decorative strip to enhance the appearance of the molding.

In the drawings:

FIG. 1 is a side elevation view of a conventional automobile, to which a molding made according to this invention may be applied.

Figures 2, 3:
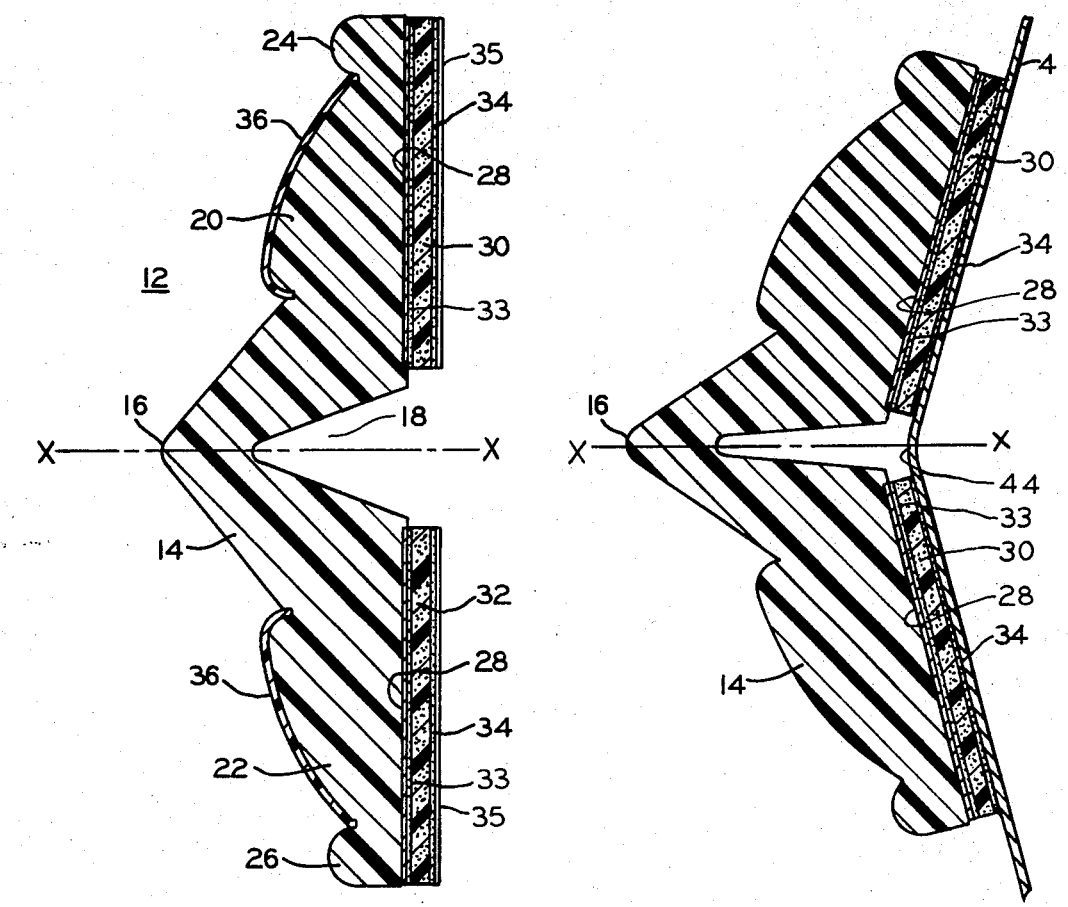

FIG. 2 is a view in cross-section through a molding made according to this invention and in its free state, i.e., before its application to the car body or such other panel which it is intended to protect; and FIG. 3 is a view in section substantially on line 33 of FIG. 1, and on approximately the scale of FIG. 2, showing the protective molding in place on an automobile body. (The molding shown in FIG. 3 does not have the decorative strips referred to.)

DESCRIPTION OF THE INVENTION

FIG. 1 shows a conventional automobile indicated generally by 2 and having the usual side panel or panels. As here shown, the left side of the automobile is presented to the observer. In the illustration, the automobile shown is what is conventionally called a "two-door," and the door there showing is the left door 4, which of course presents a substantially wide expanse of a panel which can be easily damaged by various means, such as the expedient of the door of an adjacent automobile being opened and forcibly striking the side of the protected car. In addition to the door 4, there is also in the embodiment shown a rear quarter panel 6, a rear fender 8, and a front fender panel 10. All of the surfaces 4, 6, 8 and 10 present panels or areas which at some time or other are exposed to various forms of damage and which correspondingly require protection of some sort if the pleasing appearance of the automobile is to be maintained.

The automobile shown in FIG. 1 is illustrated as being provided with a protective molding 12 made according to this invention. The protective molding 12 extends from a panel portion adjacent the front wheel back alongside the automobile body to a point near the rear end of rear fender 8. Obviously, in order to make the door 4 so that it can be opened and closed, the molding 12 must be discontinuous at the leading and trailing edges of the door panel.

There customarily are curvatures in the side panels, usually at least one portion of the automobile body presenting a strip or ridge or other protuberance extending farther out from the side of the car than the rest of the side panels and therefore subject to a greater degree of damage simply because it is the portion that is hit first. This protuberance or ridge or curved portion may of course be any of a number of shapes and sizes, and may vary in cross-sectional shape and angle from model to model, manufacturer to manufacturer and from year to year. Such a ridge having an included angle of approximately 150° is shown at 14 of FIG. 3, to which reference will be made later in this description.

Referring now to FIG. 2 of the drawings, the protective molding is shown generally at 12 and consists of a body which may be an extruded strip of a vinyl resin, such as a polyvinyl chloride, such resins being well known to those skilled in the art.

The vinyl resin body referred to above and shown in FIG. 2 at 14 is made so as to be a tough, resilient, non-porous and impervious substance, and for the sake of economy of production consistent with styling requirements, is desirably extruded to have the cross-sectional form shown in FIG. 2, in its free state. As shown, the body takes the form of a V, with the vertex of the V shown pointing to the observer's left in FIG. 2, and here identified by the reference character 16. The body is resilient about an axis X—X and, as here shown, is symmetrical about that axis. Toward the objective of resilience, body 14 is provided between the free ends with a cavity 18. Moreover, to achieve a maximum of resilience about axis X—X, the body thickness along axis X—X (i.e., the thickness of the vertex) is in one commercial form of the order of one-fourth of the total dimension from the very tip of vertex 16 to the surface of the panel to which the protective molding is ultimately secured; in actual dimensions, it is about one-sixteenth inch thick. It will be apparent to those skilled in the art that there is some leeway in the axial thickness of the body at the vertex. One of the determining factors is the degree of resilience which the molding desirably will have; another contributing factor to the resilience will of course be the stiffness of the resin of which the body is formed. Still another controlling factor in determining the axial thickness of the body at the vertex is the degree of protection which the molding must provide. The roughly one-fourth fraction (or one-sixteenth inch) which has been referred to above has been found to be a reasonable compromise between sufficient strength and sufficient flexibility to provide a molding having a high degree of commercial utility.

The free ends of the V are provided with opposed flanges, here shown at 20 and 22. At their outer extremities, the flanges are preferably provided with beads 24 and 26 respectively.

On the cavity side of the protective molding, the flanges are preferably provided with an aluminum foil 28 bonded thereto. Suitable foamed strips 30 and 32 are bonded to flanges 20 and 22 respectively. In the process of manufacture of the molding 12, the foamed strip is applied from a spiral roll in which the strip has a pressure-sensitive adhesive on each side, adjacent layers of foamed strip and their adhesive coatings being separated by an easily removable protective paper covering. The adhesively coated foamed strip is unrolled so that the side with the adhesive coating exposed is adjacent the foil 28, leaving the other face covered by the easily removable paper covering.

Specifically, pressure-sensitive adhesive coatings are shown at 33 and 34 on opposite sides of the foamed strip, and a protective paper covering is shown at 35, which will be peeled off by the customer before the customer applies the protective molding to the desired location on the panel which is to be protected.

Desirably, the flanges on their vertex sides are provided with decorative strips to give the molding a more pleasing appearance, and toward that end strips 36 are bonded to the flanges. Strips 36 may be any one of a number of such materials, as for example a metallized, dyed, or printed polyethylene terephthalate. Polyethylene terephthalate is marketed by DuPont as "Mylar," and by Goodyear as "Videne," or a strip known commercially as "Tedlar," suitably printed, may be applied.

In the illustration of the applied invention in FIG. 3, the door panel 4 is shown as provided with the aforesaid sculptured steel effect or ridge as shown at 44. It will be understood by those skilled in the art that the ridge 44 will extend outward farther than other portions of the car body, which means that the ridge 44 will be more exposed than other portions of the body and will take the brunt of damaging blows which are often suffered by automobiles in every day use. It will be found desirable or expedient to provide a protective molding made according to this invention to the ridge 44 which extends along a substantial portion of the front-to-rear length of the automobile. The included angle formed by the panel on opposite sides of the ridge or crease 44 will of course vary with the use to which the panel is put and with the design of the panel for esthetic or other reasons. Thus, the protective molding could be put on a panel presenting a nearly plane surface, with the angle between the two sides forming very nearly 180°. On the other hand, another possible application of such a protective molding could be a much more prominent angle in a formed panel, wherein the angle between the sides might be substantially less than 180°. It is desirable that a molding made according to this invention have as wide a latitude as possible in its application. For the molding to be applicable to a wide variety of panels, it is desirable that the molding have a high degree of flexibility, and such flexibility is accomplished at least in part by making the body thickness at the vertex as little as may be consistent with the desired degree of protection. Moreover, the wider the cavity 18 provided in the side away from the vertex, the greater the amount of flexing that can be accomplished before the two sides of the cavity come together.

The invention has been described with reference to the preferred embodiment. Obviously modifications and alterations will occur to others upon the reading and understanding of this specification. It is my intention to include all such modifications and alterations insofar as they come within the scope of the appended claims or the equivalence thereof.

I claim:

1. A vinyl plastic bump-protection molding adhesively mountable on an underlying motor vehicle panel having relatively inclined panel portions comprising, an elongated body of vinyl plastic having a longitudinal axis, an outer surface, inner surface portions on laterally opposite sides of said axis, and a generally V-shaped recess between said inner surface portions and dividing said body into laterally interconnected sections, adhesive means on each of said inner surface portions for adhering the corresponding inner surface portion to one of said panel portions, said V-shaped recess having a vertex spaced from said outer surface to define a longitudinally extending area of thin connection between said body sections, said inner surface portions when not attached to the vehicle body extending generally parallel to one another, and said area of connection in conjunction with said V-shaped recess providing for said body sections to be relatively displaced toward one another for said inner surface portions to be positioned parallel to the corresponding one of said inclined panel portions.

2. The bump-protection molding of claim 1, wherein said area of thin connection has a thickness between said vertex and outer surface of about one-fourth the distance from said vertex to the surface of said vehicle panel.

3. The bump-protection molding of claim 1, wherein said outer surface of said body includes outer surface portions on laterally opposite sides of said area of thin connection, and a decorative strip bonded to each of said outer surface portions.

* * * * *